UNITED STATES PATENT OFFICE.

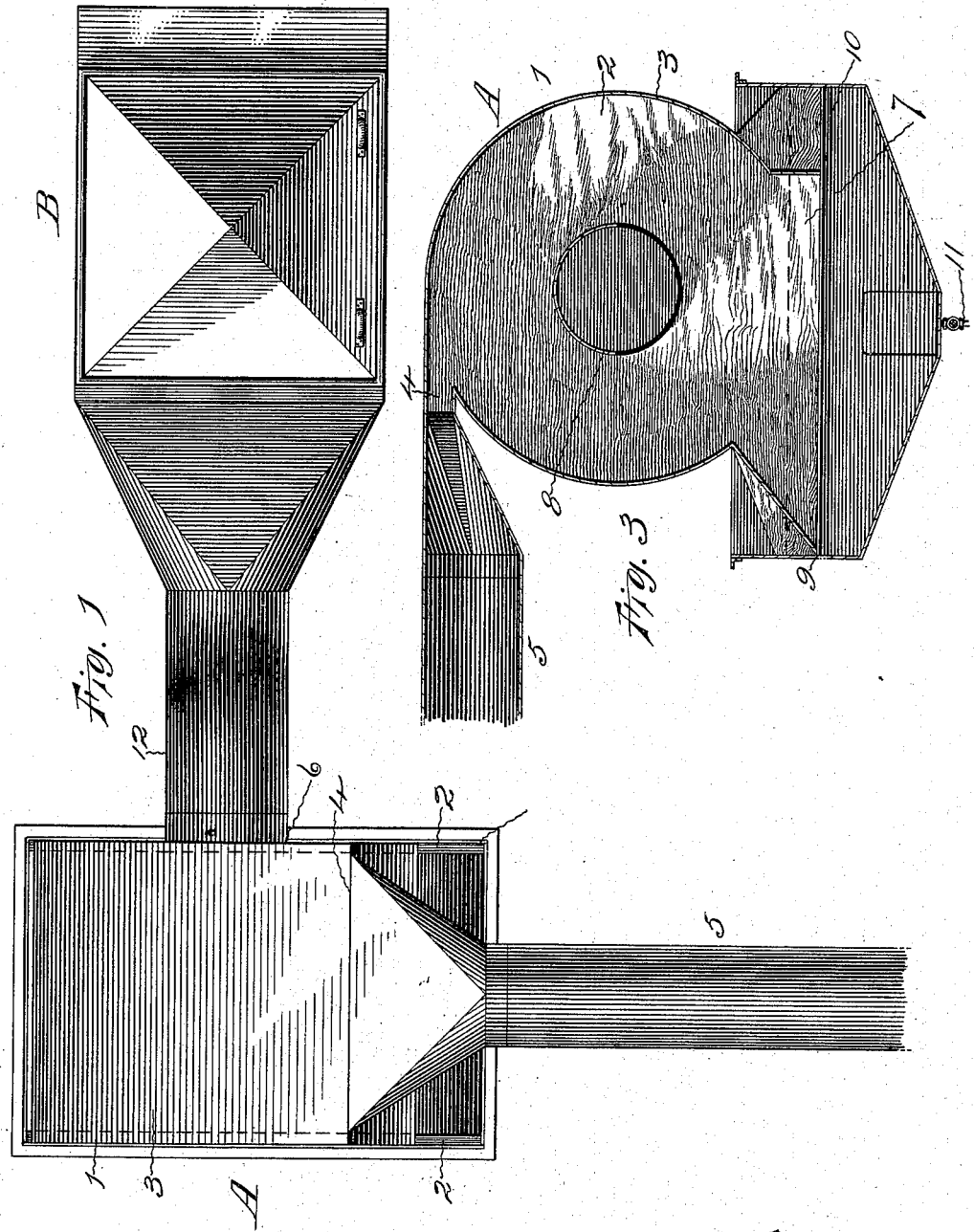

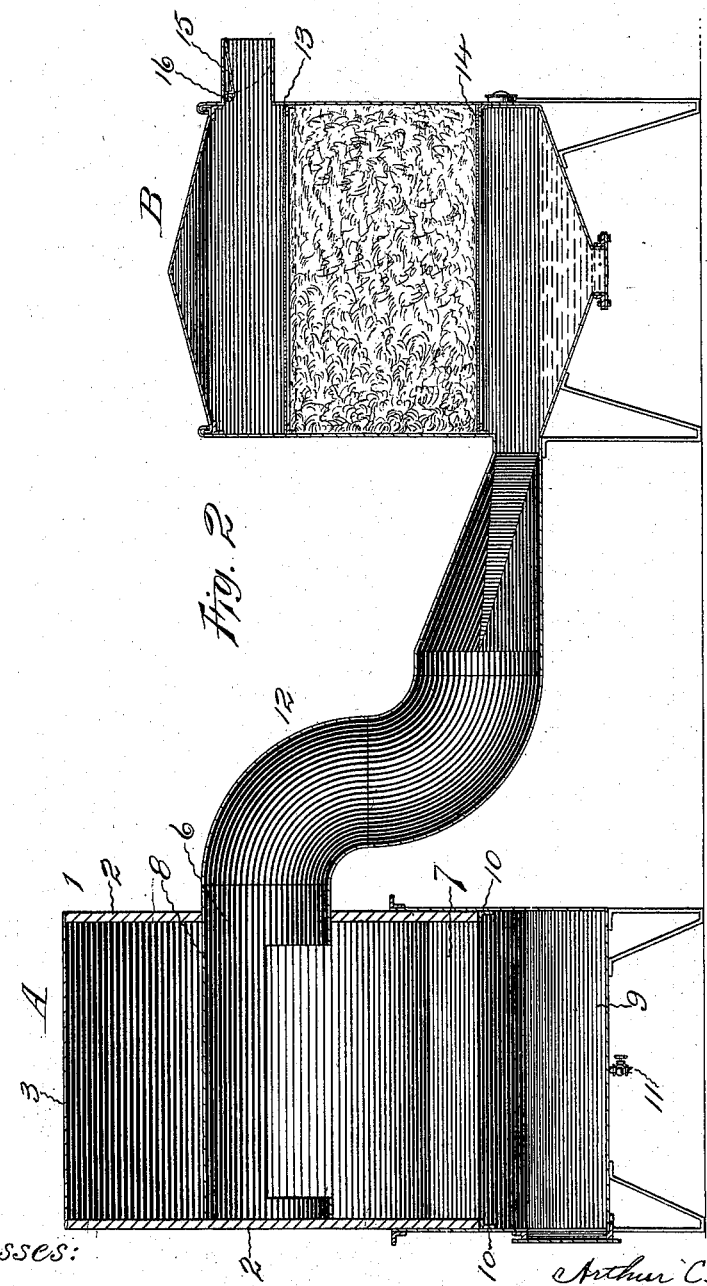

ARTHUR C. LYNCH, OF NEW YORK, N. Y., AND GEORGE W. CHRISTOPH, OF HARTFORD, CONNECTICUT.

DUST-SEPARATOR.

SPECIFICATION forming part of Letters Patent No. 567,988, dated September 22, 1896.

Application filed July 3, 1896. Serial No. 597,986. (No model.)

*To all whom it may concern:*

Be it known that we, ARTHUR C. LYNCH, residing at New York, in the county of New York and State of New York, and GEORGE W. CHRISTOPH, residing at Hartford, in the county of Hartford and State of Connecticut, citizens of the United States, have invented certain new and useful Improvements in Dust-Separators, of which the following is a specification.

The invention relates to the class of apparatus which are connected with the discharge-pipes of systems provided for collecting the dust, lint, chips, or other particles resulting from the operations of the machines within range of the collectors, for separating the particles from the air blown into the discharge-pipes, and condensing them into such masses that they can be easily arrested and gathered.

The object of the invention is to produce a simple and inexpensive apparatus of this nature which so thoroughly separates the material and is of such size and shape that it can be located without inconvenience adjacent to the fan and allowed to discharge into the same room, if desired, whereby long pipes of large size for conducting away the air and material are obviated, together with the incidental disfigurement of the rooms, walls, and ceilings through which such pipes lead, and whereby the atmosphere of the room is not continuously withdrawn and conducted away, so as to necessitate the expenditure of a large amount of fuel for heating the changed atmosphere, such as is required when the heated atmosphere of a room is withdrawn, as with the present apparatus, and new cold air is constantly entering to occupy the place of the withdrawn heated air.

Although the apparatus is applicable for separating all classes of material, that shown and described is more particularly intended for separating lint, dust, and small particles collected from burnishing, polishing, buffing, and similar abrading wheels, and, referring to the accompanying drawings, wherein the invention is illustrated as designed for such purposes, Figure 1 is a plan of one of the separators and an arrester. Fig. 2 shows the same in vertical section; and Fig. 3 is a section of the separator, taken on a plane at right angles to the section of Fig. 2.

The separator A has a cylindrical drum 1, which is usually arranged to stand on its edge. The drum shown for convenience is formed with wooden side walls 2 and a sheet-metal edge wall 3. An inlet 4 is made to enter this drum through the edge, and this inlet is adapted to be connected with a discharge-pipe 5, leading from any fan, blower, or other air-current-producing machine or apparatus that is utilized to collect the desired material that results from the operation of the machines within the range of the collectors. The air-outlet 6 is made through one or both of the side walls, and the dust-escape 7 is made through the bottom edge of the drum. Material entering the inlet is caused to pass around the drum with the heavier material gravitating under centrifugal action to the edge wall. When the heavier material reaches the escape-outlet at the bottom under the same action, it passes out of the drum. If any material should not by gravity or under centrifugal action pass through the escape at first, it will be revolved around in the drum until it does pass out, while the air purified from the dust and which occupies a position nearer the axis of the drum is forced out through the air-outlet by the incoming currents of dust and air. It is preferred to locate a shield 8 within the drum about the air-outlet. This shield may be formed by extending from side wall to side wall a tube that has a portion of its bottom wall cut away. This will prevent any particles of material that enter from dropping by gravity out of the air-outlet or from coming into the influence of any outflowing currents of purified air before being carried around the drum to the escape-outlet, but it does not prevent the free outflow of purified air.

The drum is set into a tank 9 with the part of the edge wall that is cut away to form the escape for the material to be separated opening downward into the tank. The tank may be mounted on any suitable legs or upon brackets arranged at the desired level. Angle-irons 10 are preferably secured to the inside walls of the tank for supporting the drum. The side walls of the drum preferably fit the side walls of the tank, and the edge walls are formed to close the top of the tank between the side walls of the drum. A water-pipe 11 may be led into the tank for supplying water thereto, and the water-level, which is somewhat above the lower edge of the drum and is represented by the dotted line of Fig. 3, may, if desired, be maintained by providing an automatic valve and float of common construction. It is preferred to make the bottom of the tank somewhat tapering, so that matter collected therein will settle toward the center and a cleaning-opening may be provided whereby this material may be readily removed.

Lint and dust blown into the drum of this separator and whirled around close to the edge wall is caught by the water in the tank, which water of course enters the escape-outlet at the bottom of the drum. The water holds this material until it settles to the bottom, where it remains until it is desirable or convenient for removing it, which can be accomplished by opening the outlet provided.

To the air-outlet of the drum there is preferably connected a tube 12, which leads to the arrester B. This arrester is shown as having a rectangular casing of sheet metal, and in the center of this casing, between screens 13 and 14, is placed a filtering material, such as excelsior or mineral wool. Angle-irons are preferably secured to the inner walls of the casing, and the screens that retain the filtering material are loosely laid upon these. Below the lower screen there is an open space into which the pipe from the separator opens, and below this there may, if desired, be a water-tank. In the form shown the bottom of the casing is made tapering and a cleaning-opening made at the bottom. Water may be let into this tapering bottom to a level with the inlet-opening from the separator. Above the upper screen is an open space and the outlet leads from one side of this space. The top of the casing is arranged so that it may be easily slid out of place in order that the filtering or arresting material may be readily inserted or removed as desired. A swinging door 15 is preferably located in the outlet from the upper space of this casing, and this door may be held open by a fusible link 16. Should fire break out in the filtering material this link will melt and allow the door to drop down and close the outlet, shutting off the draft. The casing is supported on any common form of legs or brackets as is most convenient.

Should any fine dust or lint fail being collected by the water in the tank below the drum of the separator and pass out through the air-outlet of the drum it will be conducted to this arrester or filtering device, where it will be wet and held by the water or retarded and retained by the fibrous matter used, so that the air which finally passes through the outlet of this arrester is very clean and pure.

The apparatus is very simple to construct and can be set in place by any one. It is effective in operation, for, while the dust and lint will probably all be collected by the tank below the separator, if any dust should escape with the air such will be held by the filtering material of the arrester. The tanks are easily supplied with water and readily cleaned when necessary, and the material collected is in a desirable position for reclaiming valuable dust, such, for instance, as gold and silver dust, which passes off with the lint of gold and silver ware buffing and polishing wheels. The water of the tank can be filtered or evaporated or the metal can be chemically precipitated. The air is so pure as it issues from the outlet that this apparatus can be located in any room adjacent to the exhausting-fan or other current-producing machine, thus economizing power and saving the expense of long pipe, and the disfiguring of rooms where long pipes are used is obviated, as well as the cutting of holes in walls and ceilings. The particular advantage, however, resulting from this resides in the fact that it is not necessary to continually draw the air out of the operating-room in which the collectors are located and blow it to a distance, thus necessitating the continual heating up of new air which enters to occupy the place of that removed. Previously it has required a great expense of fuel in large factories in cold weather for reheating the air of the room as fast as the heated air is drawn out, but with this apparatus the air is not blown out of the room. Consequently its heat is not lost.

We claim as our invention—

1. A dust-separator consisting of a rectangular tank having an inclined bottom adapted to hold liquid, a cylindrical drum with a rectangular air-inlet that opens tangentially through the peripheral wall at the top, a circular air-outlet through the center of one side wall, and a dust-outlet that opens through the peripheral wall at the bottom, the side walls of the drum at each side of the peripheral outlet entering within and supported upon shoulders in the tank below the liquid-level and the peripheral wall of the drum on one side projecting forward and downward below the liquid-level and on the other side projecting substantially vertically below the liquid-level, substantially as specified.

2. A dust-separator consisting of a rectangular tank adapted to hold liquid and provided with shoulders on its inner walls below the liquid-level, a cylindrical drum with its side walls resting upon the shoulders in the tank, said drum having a rectangular air-inlet that opens tangentially through the peripheral wall at the top, a dust-outlet that opens through the peripheral wall at the bottom into the tank below the liquid-level, and a substantially semicircular shield located in the center of the drum and opening through one side wall, a tube that is connected at one end with the projecting end of the shield and at the other end with a chamber, and a filtering material located in said chamber between the entrance at the bottom and escape at the top, substantially as specified.

ARTHUR C. LYNCH.
GEORGE W. CHRISTOPH.

Witnesses:
BLANCHE FINDLAY,
E. E. WINCKLER,
HARRY R. WILLIAMS,
C. E. BUCKLAND.